US008261309B2

(12) United States Patent
Vitito

(10) Patent No.: US 8,261,309 B2
(45) Date of Patent: Sep. 4, 2012

(54) MOBILE ENTERTAINMENT SYSTEM WITH RETRIEVAL OF AUDIO AND VIDEO MEDIA CONTENT FROM A REMOTE LIBRARY

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 280 days.

(21) Appl. No.: 12/481,026

(22) Filed: Jun. 9, 2009

(65) Prior Publication Data

US 2009/0307729 A1    Dec. 10, 2009

Related U.S. Application Data

(60) Provisional application No. 61/059,900, filed on Jun. 9, 2008.

(51) Int. Cl.
*H04N 7/18* (2006.01)
(52) U.S. Cl. .................................. 725/75; 725/81; 701/1
(58) Field of Classification Search ........................ None
See application file for complete search history.

(56) References Cited

U.S. PATENT DOCUMENTS

| | | | |
|---|---|---|---|
| 6,202,008 B1 * | 3/2001 | Beckert et al. | 701/33 |
| 6,567,660 B1 | 5/2003 | Wegener | |
| 6,606,481 B1 | 8/2003 | Tegler et al. | |
| 6,694,200 B1 | 2/2004 | Naim | |
| 6,774,926 B1 * | 8/2004 | Ellis et al. | 348/14.01 |
| 6,899,365 B2 | 5/2005 | Lavelle et al. | |
| 6,973,476 B1 | 12/2005 | Naden et al. | |
| 7,050,124 B2 | 5/2006 | Schedivy | |
| 7,062,254 B2 | 6/2006 | Hovestadt et al. | |
| 7,083,090 B2 | 8/2006 | Zuili | |
| 2001/0037360 A1 | 11/2001 | Ekkel | |
| 2002/0095680 A1 | 7/2002 | Davidson | |
| 2002/0174269 A1 | 11/2002 | Spurgat et al. | |
| 2003/0110057 A1 | 6/2003 | Pisz | |
| 2004/0002359 A1 | 1/2004 | Deas et al. | |
| 2004/0133923 A1 | 7/2004 | Watson et al. | |
| 2004/0189797 A1 | 9/2004 | Todd et al. | |
| 2004/0266336 A1 | 12/2004 | Patsiokas et al. | |
| 2005/0005298 A1 * | 1/2005 | Tranchina | 725/81 |
| 2005/0044564 A1 | 2/2005 | Stopniewicz et al. | |
| 2005/0071375 A1 | 3/2005 | Houghton et al. | |

(Continued)

*Primary Examiner* — Kristine Kincaid
*Assistant Examiner* — Oschta Montoya
(74) *Attorney, Agent, or Firm* — F. Chau & Associates, LLC.

(57) ABSTRACT

A mobile entertainment system includes a video system in combination with a media source. The video system and media source are housed within a housing secured within an automobile. The media source includes a storage medium upon which audio and video media content is stored for display upon the video system as desired by a user. A wireless global communication network access point is mounted within the automobile, wherein the media source includes wireless communication capabilities permitting communication with the wireless global communication network access point for retrieval of audio and video media content for display upon the video monitor. A remote library of audio and video media content is in wireless communication with the media source via the wireless access point. The remote library includes storage space for uploading of media content from a personal collection of audio and video media content from a user for subsequent transmission to the media source upon synchronization of the remote library with the media source thereby providing the user with access to a personal collection of audio and video content media. An access approval code is associated with the media source instructing the remote library to synchronize the audio and video media content with the media source as desired by the user.

3 Claims, 1 Drawing Sheet

U.S. PATENT DOCUMENTS

| | | |
|---|---|---|
| 2005/0075783 A1 | 4/2005 | Wolf et al. |
| 2005/0116943 A1 | 6/2005 | Wohrle et al. |
| 2005/0120380 A1 | 6/2005 | Wolfe |
| 2005/0130585 A1 | 6/2005 | Gnuschke et al. |
| 2005/0130586 A1 | 6/2005 | Gnuschke et al. |
| 2005/0216938 A1 | 9/2005 | Brady, Jr. et al. |
| 2005/0227773 A1 | 10/2005 | Lu et al. |
| 2005/0258806 A1 | 11/2005 | Janik et al. |
| 2006/0045015 A1 | 3/2006 | Nix et al. |
| 2006/0074550 A1 | 4/2006 | Freer et al. |
| 2006/0098238 A1 | 5/2006 | Ylonen |
| 2006/0107295 A1 | 5/2006 | Margis et al. |
| 2006/0130099 A1 | 6/2006 | Rooyen |
| 2006/0138308 A1 | 6/2006 | Davis et al. |
| 2006/0181982 A1 | 8/2006 | Villevieille et al. |
| 2006/0184968 A1 | 8/2006 | Clayton et al. |

\* cited by examiner

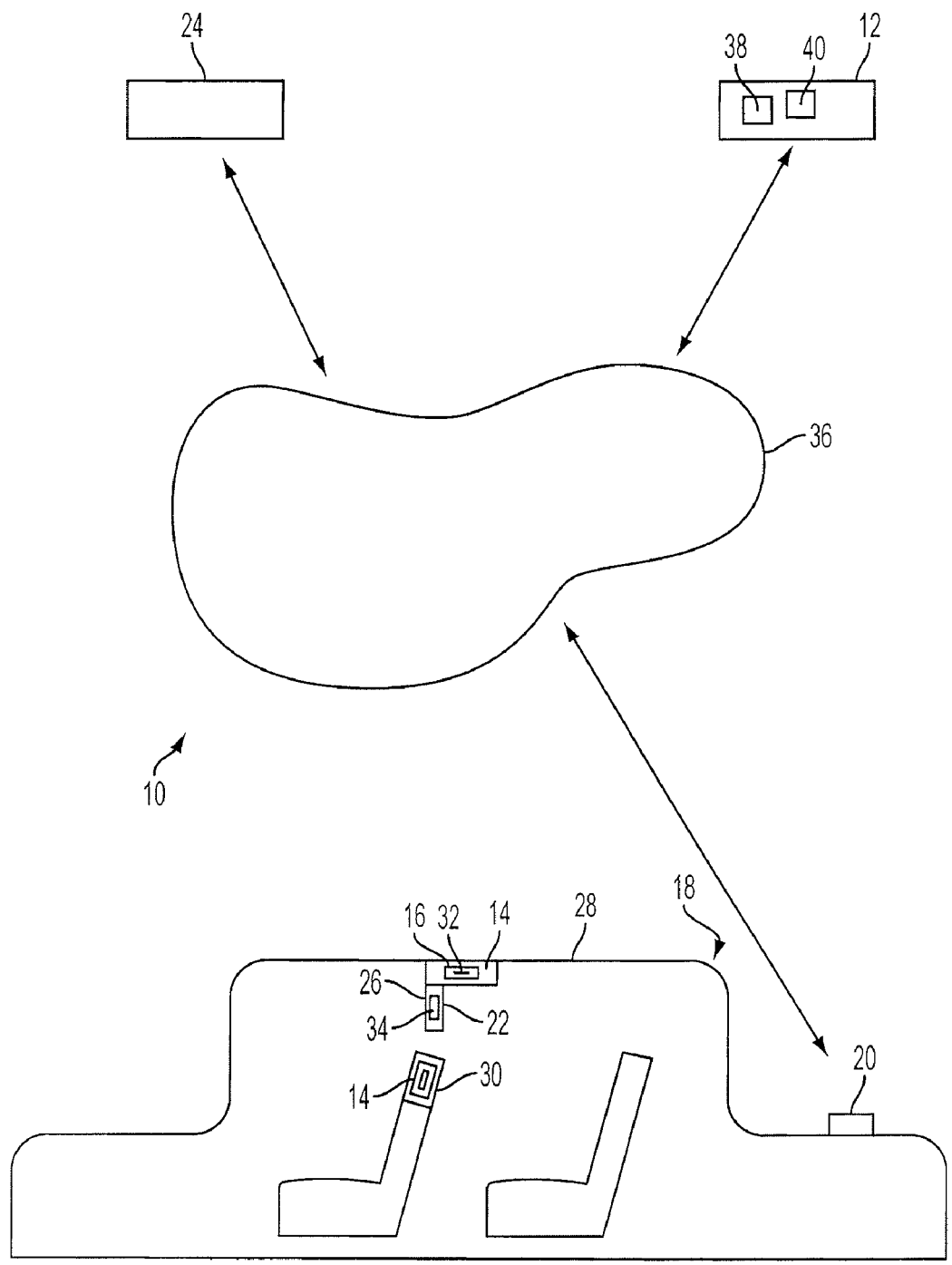

MOBILE ENTERTAINMENT SYSTEM WITH RETRIEVAL OF AUDIO AND VIDEO MEDIA CONTENT FROM A REMOTE LIBRARY

CROSS REFERENCE TO RELATED APPLICATIONS

This application claims the benefit of U.S. Patent Application Ser. No. 61/059,900, filed Jun. 9, 2008, entitled "MOBILE ENTERTAINMENT SYSTEM WITH RETRIEVAL OF AUDIO AND VIDEO MEDIA CONTENT FROM A REMOTE LIBRARY".

BACKGROUND OF THE INVENTION

1. Field of the Invention

The invention relates to a mobile entertainment system. More particularly, the invention relates to a mobile entertainment system permitting retrieval of audio and video media content from a remote library.

2. Description of the Related Art

As CDs and DVDs, and the audio and video content maintained thereon, are replaced with hard drive based server type systems for the storage, retrieval and playing of media content, it has become difficult for consumers to maintain and utilize their available media content within the mobile entertainment systems commonly found in automobiles. As such, a need exists for a mechanism whereby consumers may utilize their stored media content within their automobile at their convenience and with the freedom they have become accustomed to when utilizing such media content within their own homes. The present invention provides a system for achieving just this.

SUMMARY OF THE INVENTION

It is, therefore, an object of the present invention to provide a mobile entertainment system including a video system in combination with a media source. The video system and media source are housed within a housing secured within an automobile. The media source includes a storage medium upon which audio and video media content is stored for display upon the video system as desired by a user. A wireless global communication network access point is mounted within the automobile, wherein the media source includes wireless communication capabilities permitting communication with the wireless global communication network access point for retrieval of audio and video media content for display upon the video monitor. A remote library of audio and video media content is in wireless communication with the media source via the wireless access point. The remote library includes storage space for uploading of media content from a personal collection of audio and video media content from a user for subsequent transmission to the media source upon synchronization of the remote library with the media source thereby providing the user with access to a personal collection of audio and video content media. An access approval code is associated with the media source instructing the remote library to synchronize the audio and video media content with the media source as desired by the user.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a schematic of the present mobile entertainment system.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to the various figures, a mobile entertainment system 10 permitting retrieval of audio and video media content from a remote library 12 is disclosed. The mobile entertainment system 10 includes a video system 14 in combination with a media source 16. The video system 14 and media source 16 are housed within a housing 26 secured within an automobile 18. The media source 16 includes a storage medium 32 upon which audio and video media content is stored for display upon the video monitor 22 of the video system 14 as desired by a user.

A wireless global communication network access point 20 is mounted within the automobile 18. The media source 16 includes wireless communication capabilities permitting communication with the wireless global communication network access point 20 for retrieval of audio and video media content for display upon the video monitor 22 of the video system 14.

A remote library 12 of audio and video media content is in wireless communication with the media source 16 via the network access point 20. The remote library 12 includes storage space for uploading of media content from a personal collection of audio and video media content 24 stored, for example, as a home computer linked to the remote library via the Internet 36. The uploaded personal collection of audio and video media content 24 from a user for subsequent transmission to the media source 16 upon synchronization of the remote library 12 with the media source 16 thereby provides the user with access to a personal collection of audio and video media content 24. An access approval code is associated with the media source 16 instructing the remote library 12 to synchronize the personal collection of audio and video media content 24 with the media source 16 as desired by the user.

As briefly mentioned above, the mobile entertainment system 10 includes a video system 14 in combination with a media source 16. The video system 14 and media source 16 are housed within a housing 26 secured within an automobile 18. For example, and in accordance with a preferred embodiment of the present invention, the video system 14 is mounted within the ceiling 28 of an automobile 18 for selective viewing by passengers in the rear seat of the automobile 18 or the video system 14 is mounted within a headrest 30 of an automobile 18 for viewing by those sitting in the rear seats of the automobile 18. While a ceiling mounting video system and a headrest mounted video system are disclosed in accordance with a preferred embodiment of the present invention, those skilled in the art will appreciate, other locations within an automobile are certainly possible without departing from the spirit of the present invention.

The media source 16 includes a storage medium 32 upon which audio and video media content is stored for display upon the video monitor 22 of the video system 14 as desired by a user. For example, and in accordance with a preferred embodiment of the present invention, the media source 16 is a hard drive upon which both audio and video content, as well as other viewable content, may be readily stored. However, and as those skilled in the art will certainly appreciate, the media source may take a variety of forms as technology moves forward, without departing from the spirit of the present invention.

In addition to the provision of the media source 16 in conjunction with the video system, the video system may also be provided with a DVD player 34 or other similar media player allowing the operator to play videos when those available via the media source are not desired.

A wireless global communication network access point 20 is mounted within the automobile 18 and is in wireless communication with the media source 16 for the transfer of data therebetween. The wireless connection between the media source 16 and the network access point 20 may be achieved by various known protocols, for example, but not limited to WiFi. While a wireless connection between the network access point and the media source is disclosed in accordance with a preferred embodiment of the present invention, it is possible the utilization of a conventional wired connection might be more appropriate under certain circumstances and the use thereof would certainly fall within the spirit of the present invention.

In accordance with a preferred embodiment of the present invention, the wireless global communication network access point 20 provides users with access to a global communication network 36, for example, the Internet, for access to a variety of data sources in a real time, high-speed manner. The wireless global communication network 36 allows the media source 16, to which it is connected via the wireless global communication network access point 20, to synchronize with the remote library 12.

With this in mind, and as briefly discussed above, the media source 16 includes wireless communication capabilities permitting communication with the wireless global communication network access point 20 for retrieval of audio and video media content from the remote library 12 for display upon the video monitor 22 of the video system 14. As will be appreciated based upon the present disclosure, the media source 16 downloads information from the operator's personal collection of audio and video media content 24 or from a secure media source containing selected content maintained on the remote library 12 for storage therein and display upon the video monitor 22.

More specifically, a remote library 12 of audio and video media content is in wireless communication with the media source 16 via the wireless global communication network access point 20. The remote library 12 includes storage space 40 for uploading of media content from a personal collection of audio and video media content 24 from a user for subsequent transmission to the media source 16 upon synchronization of the remote library 12 with the media source 16 thereby providing the user with access to a personal collection of audio and video media content 24.

As briefly mentioned above, an access approval code is associated with the media source 16 instructing the remote library 12 to synchronize the audio and video media content with the media source 16 as desired by the user. As a result, each time the media source 16 is activated, or when desired by the operator under certain circumstances, the media source 16 will communicate with the remote library 12 via the network access point 20 to ascertain whether additional audio or video content is available. If it is determined audio or video content is available for downloading, the content will either be downloaded to the media source 16 automatically or the user will be provided with a prompt asking whether he or she wishes to have the audio and/or video content download to the media source 16 for viewing upon the video monitor 22.

In addition to providing the user with access to a personal collection of audio and video media content 24, the remote library 12 of audio and video content may also provide the operator with access to selected content 38 he or she subscribes to through a predetermined subscription arrangement. For example, the operator may be provided with access to a certain level of video content (for example, old documentaries) through the provision of one subscription fee or the operator may be provided with access to another level of video content (for example, first run movies) through the provision of another subscription fee.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A mobile entertainment system, comprising:
a video system in combination with a media source, the video system and media source are housed within a housing secured within an automobile;
the media source includes a storage medium upon which audio and video media content is stored for display upon the video system as desired by a user;
a wireless global communication network access point mounted within the automobile, wherein the media source includes wireless communication capabilities permitting communication with the wireless global communication network access point for retrieval of audio and video media content for display upon the video monitor;
a remote library of audio and video media content in wireless communication with the media source via the wireless global communication network access point, the remote library including storage space for uploading of media content from a personal collection of audio and video media content from a user for subsequent transmission to the media source upon synchronization of the remote library with the media source thereby providing the user with access to a personal collection of audio and video content media;
an access approval code associated with the media source instructing the remote library to synchronize the audio and video media content with the media source as desired by the user, wherein the media source communicates with the remote library via the wireless global communication network access point to ascertain whether at least one of additional audio or video content is available, and if it is determined that the additional audio or video content is available for downloading, the additional audio or video content is one of downloaded to the media source automatically or the user is provided with a prompt asking whether the user wishes to have the additional audio or video content downloaded to the media source.

2. The mobile entertainment system of claim 1, wherein each time the media source is activated, the media source communicates with the remote library via the wireless global communication network access point to ascertain whether the additional audio or video content is available.

3. The mobile entertainment system of claim 1, wherein when desired by the user, the media source communicates with the remote library via the wireless global communication network access point to ascertain whether the additional audio or video content is available.

* * * * *